United States Patent [19]

Sievenpiper

[11] 3,774,920
[45] Nov. 27, 1973

[54] PISTON RING SYSTEM
[75] Inventor: Ward Sievenpiper, Milgrove, N.Y.
[73] Assignee: A-T-O Inc., Willoughby, Ohio
[22] Filed: July 12, 1972
[21] Appl. No.: 271,204

[52] U.S. Cl.................. 277/165, 277/194, 277/156
[51] Int. Cl............................................... F16j 9/08
[58] Field of Search................. 277/165, 188, 205, 277/190, 191, 194, 193, 141, 143, 138, 176, 177, 136, 137

[56] References Cited
UNITED STATES PATENTS
3,612,538  10/1971  Sievenpiper ........................ 277/165
2,962,330  11/1960  Kohl .................................. 277/205
3,559,733  2/1971  Kilgore .............................. 277/188

Primary Examiner—William T. Dixson, Jr.
Assistant Examiner—Robert I. Smith
Attorney—Christel & Bean

[57] ABSTRACT

A multiple element seal ring system for fluid actuators comprising first and second resiliently yieldable dynamic sealing elements and a resiliently yieldable static sealing element, the last being of a material having a lower durometer rating than the first two. Each of the three sealing elements consists of an endless annular body for maintaining the seal ring system in a true round condition at all times.

5 Claims, 7 Drawing Figures

PATENTED NOV 27 1973 3,774,920

PISTON RING SYSTEM

BACKGROUND OF THE INVENTION

This invention relates to seal ring systems for fluid actuators and, more particularly, to seal ring systems of a composite design especially adapted for low fluid pressure applications.

Recent seal designs for fluid actuators include multiple component ring systems provided with split rings often formed of metal, rendering them susceptible to galling. Because of the ring partings, these split rings tend to deviate from a true circular configuration in use. While this out-of-round characteristic can be tolerated in those split ring elements employed in large diameter reciprocating members, such as a piston used in high pressure applications, it does pose problems in relatively small diameter applications commonly associated with low fluid pressure systems.

SUMMARY OF THE INVENTION

The primary object of the present invention is to avoid the above problems by providing an improved, multiple element seal ring system maintaining a true round condition and which has an extremely long useful life.

The seal ring system of this invention is characterized by the provision of a pair of somewhat resiliently yieldable endless sealing ring elements captively disposed in abutting relation about a piston or other element and having an interference fit with the other surface to be sealed to provide dynamic pressure sealing thereagainst. A third resiliently yieldable endless sealing ring element, substantially softer than the other two elements and retained in a groove defined thereby, provides static pressure sealing against the groove inner surface and the recessed surfaces of the other two endless sealing elements. The three sealing elements are maintained in a true round condition under the influence of fluid pressure to provide an effective seal against fluid leakage.

The foregoing and other objects, advantages and characterizing features of the present invention will become clearly apparent from the ensuing detailed description of an illustrative embodiment thereof, taken together with the accompanying drawing wherein like reference characters denote like parts throughout the various views.

BRIEF DESCRIPTION OF THE DRAWING

FIG. 5 is a front elevational view of another endless sealing element of the sealing ring system shown in FIG. 1.

DETAILED DESCRIPTION OF THE ILLUSTRATED EMBODIMENT

Figures 1, 2:
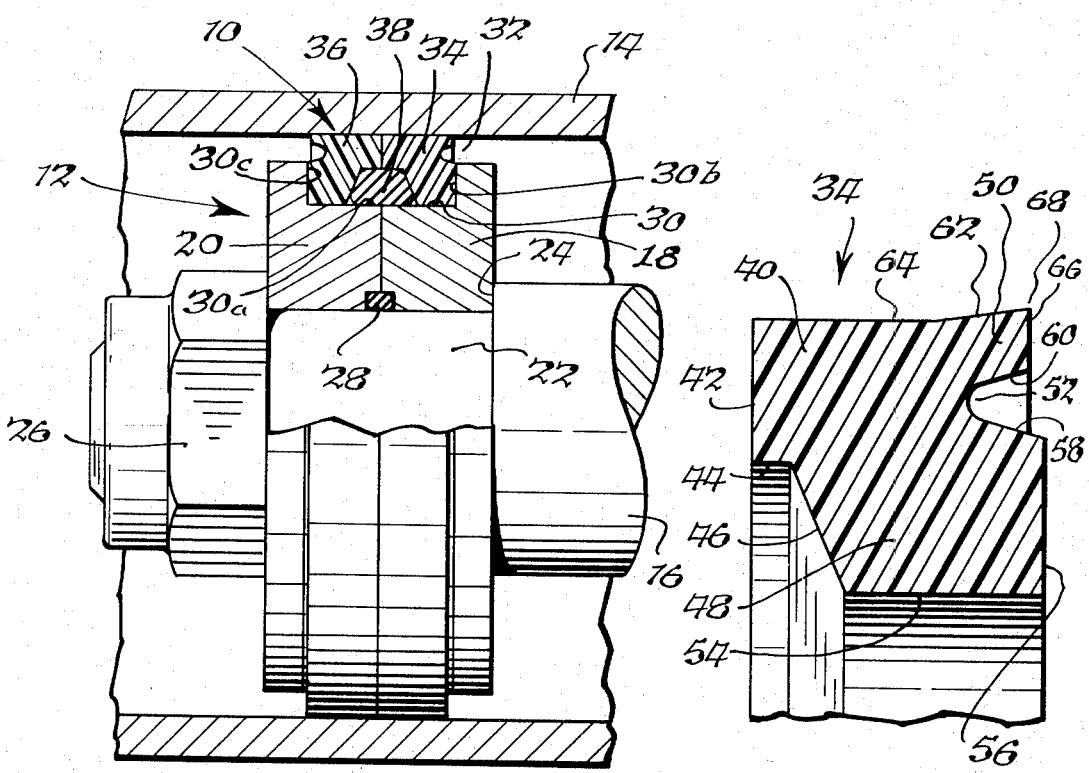
FIG. 1 is a fragmentary, longitudinal sectional view of a portion of an hydraulic cylinder including a piston incorporating the multiple element seal ring system of this invention.
FIG. 2 is a fragmentary, longitudinal quarter-sectional view, on an enlarged scale, of one of the sealing elements of the seal ring system shown in FIG. 1.
Figures 3, 4, 5:
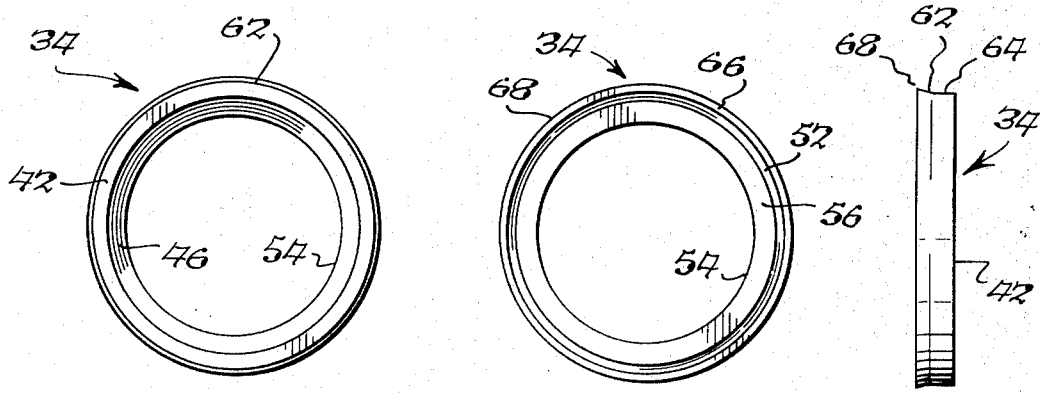
FIG. 3 is a front elevational view showing one face of the endless sealing element of FIG. 2.
FIG. 4 is a rear elevational view showing the other face of the endless sealing element of FIG. 2.
FIG. 5 is a side elevational view of the endless sealing element of FIG. 2.
Figures 6, 7:
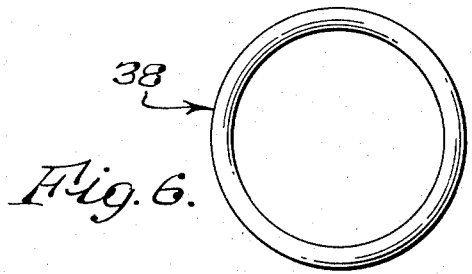
FIG. 7 is a fragmentary cross-sectional view, on an enlarged scale, of the endless sealing element of FIG. 6.

Referring now in detail to the illustrative embodiment depicted in the drawing, there is shown in FIG. 1 a seal ring assembly or system, generally designated 10, constructed in accordance with this invention and incorporated in a piston 12 mounted for reciprocating movement in an hydraulic cylinder 14. Piston 12 is removably secured to one end of a piston rod 16, the other end of which extends axially outwardly of the cylinder housing for connection to a mechanical load (not shown).

In the particular embodiment illustrated, piston 12 includes two annular members 18 and 20 disposed about a reduced diameter portion 22 of piston rod 16 and held in assembled relation against an annular shoulder 24 of rod 16 by a clamp nut 26 threaded onto the inner end of piston rod 16. An O-ring seal 28 is disposed about reduced diameter portion 22 adjacent the abutting faces of members 18 and 20 which are recessed to receive ring 28 which provides a fluid tight seal therebetween.

Members 18 and 20 are provided with peripheral recesses adjacent the abutting faces thereof to form a composite groove 30 for receiving seal ring system 10 such groove 30 being defined by a bottom wall surface $30_a$ and spaced-apart, parallel radial side wall surfaces $30b$ and $30c$. An annular space 32, shown greatly exaggerated in FIG. 1, exists between piston 12 and the inner wall surface of cylinder 14 to provide working clearance, such space 32 being closed by seal ring system 10.

In accordance with the present invention, seal ring system 10 comprises a first annular sealing element 34, a second annular sealing element 36, and a conventional O-ring seal 38. Annular elements 34 and 36 are juxtaposed in axial abutting relation in groove 30 to provide a dynamic fluid tight seal between piston 12 and the inner wall surface of cylinder 14.

Annular elements 34 and 36 are of identical construction but oriented in oppositely facing directions when assembled as shown in FIG. 1. Each annular element 34, 36 is composed of a somewhat resiliently yieldable synthetic plastic material, preferably a urethane, having a relatively high durometer rating, and which is sufficiently rigid to withstand the pressure forces acting thereagainst but will deform to some degree under the influence of pressure. While the material of which elements 34, 36 are composed preferably is urethane, it should be understood that other synthetic plastics exhibiting similar characteristics can be utilized.

Each member 34, 36 is in the form of an endless ring and comprises an annular body 40 having a generally planar axial end face 42 and provided at its inner periphery with an annular recess extending inwardly of end face 42 and defined by an inner circumferential axial surface 44 (FIG. 2) and an inclined surface 46. Body 40 is formed at its opposite end face into a first annular flange 48 and a second annular flange 50 extending outwardly from body 40, the latter in a slightly divergent relation, and joined together at their inner ends to form a well portion or cup-shaped cavity 52.

Flange 48 extends generally axially from body 40 and has an inner circumferential bearing surface 54 comprising a continuation of the body inner surface and adapted to engage the bottom wall 30a of groove 30 in the assembled relation. Annular flange 48 terminates in an axial end face 56 parallel to body end face 42 and joining bearing surface 54 at a sharp, right angular edge. Flange 48 also is provided with a short, outer, inclined wall 58 extending inwardly from end face 56 away from the axis of body 40 and partially defining cavity 52.

Annular flange 50 extends outwardly from body 40 and has a short, inner wall 60 inclined relative to the axis of body 40 in a diverging relation to wall 58 of flange 48 to form cavity 52 therebetween. Flange 50 has an inclined outer wall 62 generally parallel to wall 60 and joined at its inner end to a straight, axial outer wall portion 64 of body 40. Flange 50 terminates in a radial end face 66 parallel to end face 56 of flange 48 but slightly inwardly offset therefrom, as shown in FIG. 2, and forming with the outer wall 62 of flange 50 an annular sealing lip 68 providing an effective dynamic wiping edge.

O-ring seal element 38 also is in the form of an endless ring comprising an endless body formed of a relatively soft, resiliently yieldable material having a lower durometer rating than sealing elements 34 and 36 and which is readily deformed under the influence of low pressures. O-ring seal element 38 can be formed of rubber, or any other suitable synthetic elastomeric material, and can be entirely conventional per se.

Seal ring system 10 is captively contained within groove 30 which is concentric with the axis of piston 12 and has a generally rectangular cavity configuration in axial section, as defined by bottom wall surface 30a and axially spaced side wall surfaces 30b and 30c. Elements 34, 36 and 38 are fitted into groove 30 in operative position within cylinder 14 and initially assume a somewhat relaxed condition, as shown in FIG. 1. Specifically, sealing elements 34 and 36 are disposed in groove 30 in an opposed relation facing away from each other with their respective axial end faces 42 abutting each other. Annular flange 50 are depressed radially inwardly with lips 68 in wiping sealing engagement with the inner wall surface of cylinder 14 providing an interference fit therebetween. The inner wall surfaces 54 of sealing elements 34 and 36 rest against the bottom wall surface 30a of groove 30. The combined axial length of sealing elements 34 and 36 is slightly less than the axial length of groove 15.

O-ring 38 is captively held within the groove formed by the inner recesses of sealing elements 34 and 36 and provides a static seal against the groove bottom wall 30a and against surfaces 44 and 46 of sealing elements 34 and 36, respectively. As shown in FIG. 1, in providing such static seal ring element 38 is deformed to conform generally to the cross sectional trapezoidal configuration of the groove formed by surfaces 44 and 46 of sealing elements 34 and 36.

In illustrating the operation of seal ring system 10, assume that fluid under pressure is applied to the right side of piston 12, as viewed in FIG. 1, urging the same toward the left. Fluid pressure entering clearance 32 and acting on the right side of sealing element 34 causes the entire seal ring system 10 to move slightly axially to the left within groove 30. Of course, the extent of axial movement is very small due to the minute clearances between seal ring system 10 and the opposite side wall surfaces 30b and 30c of groove 30. However, this slight axial movement is sufficient to allow fluid under pressure to flow between face 56 of sealing element 34 and groove side wall surface 30b and between sealing element inner surface 54 and groove bottom wall surface 30a to act against ring element 38. The fluid under pressure acting against ring 38 increases the sealing pressure thereof against groove bottom wall surface 30a as well as against the inclined surface 46 of seal element 36. In addition, the fluid pressure acting against annular flange 50 urges outer wall 62 and lip 68 thereof into firmer pressure sealing engagement against the inner wall surface of cylinder 14. The sealing engagement of lip 68 against the inner wall surface of cylinder 14, caused by the interference fit therebetween, is augmented by the action of fluid pressure in cavity 52. Ring seal system 10 seals in an equally effective manner against fluid pressure acting in an opposite direction from that described above.

Seal ring system 10 is especially adapted for relatively low pressure applications in which the piston diameter are relatively small because the endless ring configurations of sealing elements 34 and 36 maintain seal ring system 10 in a true round condition for maximum sealing efficiency at all times. Any deformation of annular flanges 50, for example, will occur uniformly throughout its peripheral extent thereby assuming a true round condition at all times.

As a result of this invention, an improved seal ring system is provided for fluid actuators and comprises a pair of endless, annular sealing elements having an interference dynamic sealing fit with the surface to be sealed and an endless, relatively soft, annular sealing element associated therewith for providing static pressure sealing against the groove inner surfaces and the inner surfaces of the first-mentioned sealing elements. The endless annular configurations of these elements maintains the seal ring system in true round condition at all times to prevent fluid bypass.

A preferred embodiment of this invention having been described in detail, it is to be understood that this has been done by way of illustration only.

I claim:

1. A seal ring assembly comprising: a first annular sealing element and a second annular sealing element disposed in axial abutting relation and adapted to be captively retained in a peripheral groove formed in a member relatively reciprocable in a tubular member; the axial ends of said sealing elements which are in non abutting relationship having axially outwardly facing flanges defining cavities therebetween, one of said flanges having an inclined outer wall portion terminating in an annular sealing lip having an interference fit with said inner wall surface of said tubular member; said first and second sealing elements having portions, respectively, in sealing engagement with the inner wall surface of said tubular member; said sealing elements having inner recesses defining a composite groove; a third sealing element received in said composite groove and having portions in sealing engagement with the peripheral groove bottom wall and with said first and second sealing elements; said first, second, and third sealing elements each having an endless annular body maintaining said seal ring assembly in a ture rounded condition.

2. A seal ring assembly according to claim 1 wherein said first and second elements are formed of a resiliently yieldable material and said third sealing element is formed of a relatively soft resiliently yieldable material of a lower durometer rating than said first and second sealing elements; each of said first and second sealing element bodies being provided with an inner surface of parallel tothe axis of said body; each of said inner recesses of said first and second sealing elements being defined by a surface extending inwardly of said planar axial end face and concentric with said body inner surface and an inclined surface extending from the inner end of said inwardly extending surface inwardly to said body inner surface; said third sealing element having portions, respectively, in sealing engagement with said inwardly extending surfaces and said inclined surfaces of said first and second sealing elements, respectively.

3. A seal ring assembly according to claim 1 wherein each of said first and second sealing element bodies is provided with an inner surface parallel to the axis of said body and a planar axial end face extending normal to the axis of said body; each of said inner recesses of said first and second sealing elements being defined by a surface extending inwardly of said planar axial end face and concentric with said body inner surface and an inclined surface extending from the inner end of said inwardly extending surface inwardly to said body inner surface.

4. A seal ring assembly according to claim 3 wherein said third sealing element has portions, respectively, in sealing engagement with said inwardly extending surfaces and said inclined surfaces of said first and second sealing elements, respectively.

5. A seal ring assembly according to claim 1 wherein said first and second sealing elements are formed of a resiliently yieldable material and said third sealing element is formed of a relatively soft resiliently yieldable material of a lower durometer rating than said first and second sealing elements.

* * * * *

UNITED STATES PATENT OFFICE
CERTIFICATE OF CORRECTION

Patent No. 3,774,920      Dated November 27, 1973

Inventor(s) Ward Sievenpiper

It is certified that error appears in the above-identified patent and that said Letters Patent are hereby corrected as shown below:

Claim 2, column 5, line 8 delete "of" (first occurrence)

Signed and sealed this 17th day of September 1974.

(SEAL)
Attest:

McCOY M. GIBSON JR.       C. MARSHALL DANN
Attesting Officer      Commissioner of Patents